L. BULL.
PULSATOR FOR MILKING MACHINES.
APPLICATION FILED DEC. 19, 1914.

1,204,542.

Patented Nov. 14, 1916.
2 SHEETS—SHEET 1.

Witnesses:

Inventor:
Lionel Bull,
by Frank D. Thomason
Atty.

L. BULL.
PULSATOR FOR MILKING MACHINES.
APPLICATION FILED DEC. 19, 1914.
1,204,542.
Patented Nov. 14, 1916.
2 SHEETS—SHEET 2.
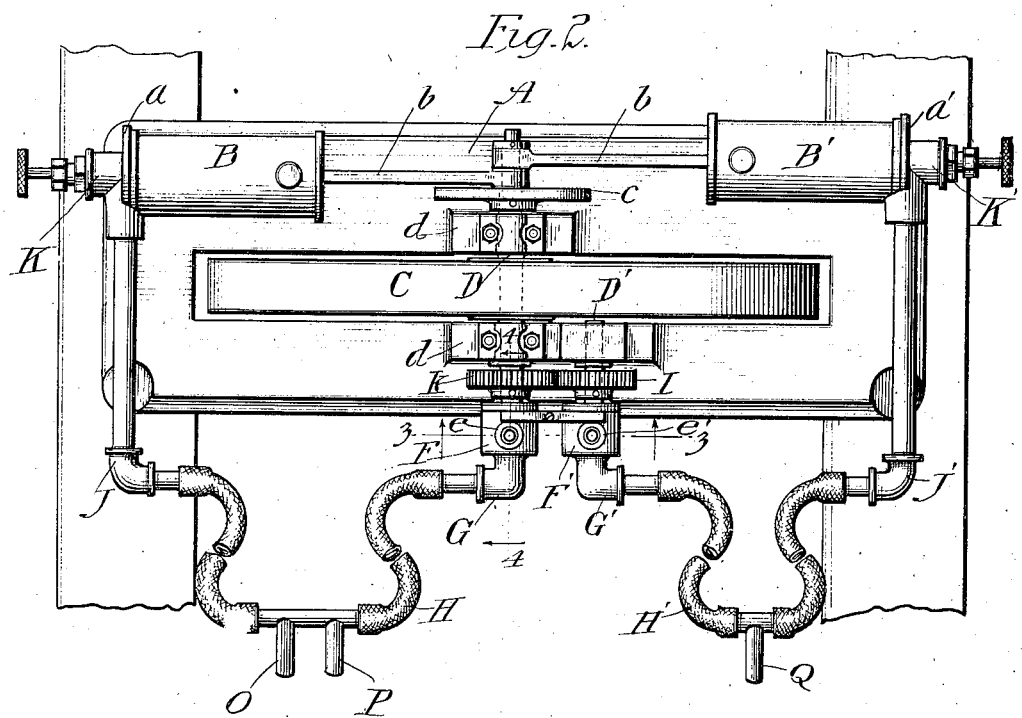
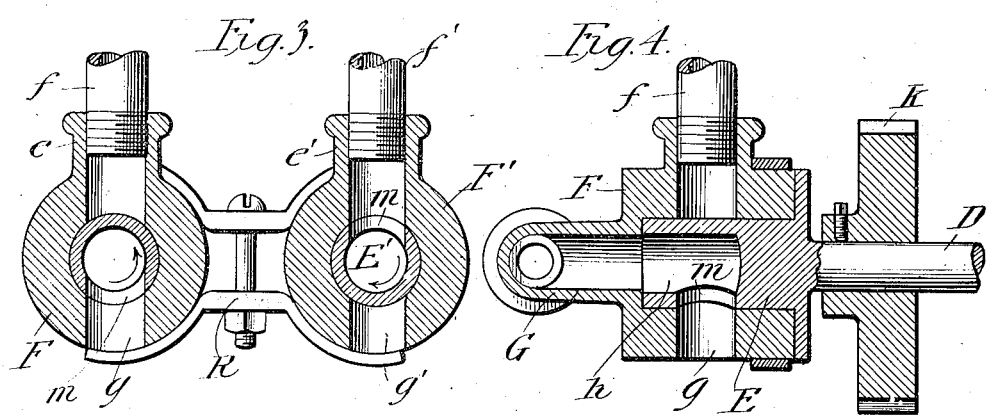
Witnesses:
Inventor
Lionel Bull,
by Frank D. Thompson
Atty.

UNITED STATES PATENT OFFICE.

LIONEL BULL, OF LIBERTYVILLE, ILLINOIS, ASSIGNOR OF ONE-HALF TO GEORGE R. LINN, OF CHICAGO, ILLINOIS.

PULSATOR FOR MILKING-MACHINES.

1,204,542.  Specification of Letters Patent.  Patented Nov. 14, 1916.

Application filed December 19, 1914. Serial No. 878,011.

*To all whom it may concern:*

Be it known that I, LIONEL BULL, a subject of the King of England, residing at Libertyville, in the county of Lake and State of Illinois, have invented new and useful Improvements in Pulsators for Milking-Machines, of which the following is a full, clear, and exact description.

My invention relates to improvements in pulsators for milking machines, and particularly to the means for intermittently varying the pressure in a milking system.

The objects of my invention are primarily to obtain a rhythmic variation of the minus pressure in the teat-cups, and to provide momentum devices for the means for so doing that govern and make said action more rhythmic and greatly relieve the tax on the power of the vacuum generator. This I accomplish by the means hereinafter fully described, and as particularly pointed out in the claims.

Figure 1:
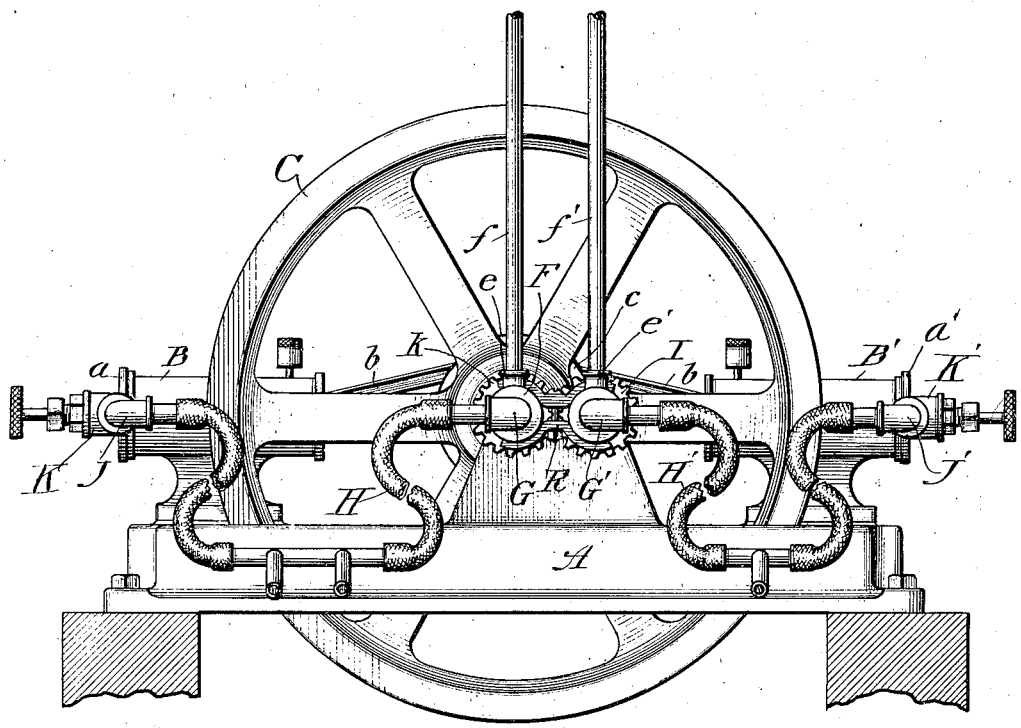
Figure 5:
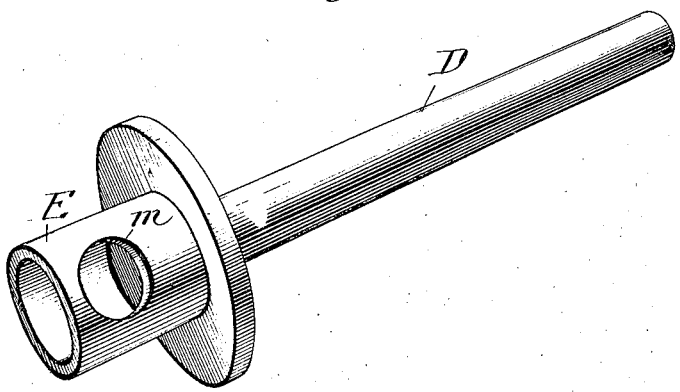

In the drawings: Figure 1 is a side elevation of my invention. Fig. 2 is a plan view thereof. Fig. 3 is a vertical section of the rotary valves, taken on dotted line 3—3, Fig. 2. Fig. 4 is a longitudinal central section of one of the valves and its casing. Fig. 5 is a perspective view of one of said valves removed from its casing.

It is unnecessary to illustrate or describe either the vacuum creating pump or mechanism or the teat-cups, as any of these features now in extensive use can be employed, and so I have confined this specification to the illustration and description of my improved means for utilizing the same.

Referring to the drawings, A represents a base of any suitable design which has opposed longitudinally disposed cylinders B and B' mounted on platforms integral with said base and located thereon. The axes of these cylinders are, preferably, offset to a slight extent and said cylinders are provided with piston-heads that are connected by pitmen $b, b$, to a single crank pin carried by a shaft D located midway between said cylinders and journaled in suitable bearings $d, d$, rising from said base; upon which shaft a balance-wheel C is securely mounted.

The end of shaft D opposite that upon which the balance-wheel is mounted extends through its bearings and has a rotary-valve E mounted thereon consisting of a solid cylindrical body of a suitable length which revolves in a closely fitting stationary casing F. This casing has a lateral nipple $e$ to which leads a vacuum pipe $f$; a lateral port $g$ opposite the nipple and open to the atmosphere; and a nipple G on the axis of the valve E. The valve has a central chamber $h$ constantly open to the nipple G, and a lateral port $m$ opening from this chamber and registering alternately with the nipple $e$ and the port $g$ as the valve rotates. A pipe H, which may, as indicated in the drawings, be flexible, leads from the connection G to the outer or closed end $a$ of the cylinder B through a connection J, and a regulating valve K is placed in this connection.

Between the casing F and balance-wheel C shaft D has a small gear $k$ securely mounted thereon and this gear meshes with a corresponding gear I securely mounted on a short shaft D', which latter is journaled in bearings secured to and rising from the base, and has its axis parallel to that of shaft D. The shaft D' carries on its end a valve E' fitting within a casing F' which may be supported in any suitable manner, as by means of a clamp R, attaching it to the casing F. The valve E' and casing F' are preferably the same in form as the valve and casing E, F, there being a central valve chamber open at its end and a lateral port $m$ and the casing having a lateral nipple $e'$ connected with a vacuum pipe $f'$; a lateral opening $g'$ open to the atmosphere, and a nipple G' constantly open to the end of the valve chamber. A pipe H' communicates with the closed or outer end $a'$ of the cylinder B' through a connection J' provided with a regulating valve K'. The valves E and E' are set with their ports $m, m$, oppositely placed, as shown in Fig. 3, and relatively as to the pistons of the cylinders with which they are respectively associated, so that vacuum is applied to the cylinders when their pistons are at the ends of their outstrokes, and atmosphere at the ends of the instrokes.

The balance wheel C being started by hand, the pulsator will run so long as vacuum is maintained in the pipes $f, f'$, and the speed may be regulated by means of the valves K, K'.

Pipes H, H', are provided with lateral nipples, as O, P, Q, as many as may be desired, for connection with the teat-cups of a milking apparatus, whereby the motor performs the function for which it is designed of alternately applying to these cups atmospheric pressure and suction.

While the device is shown as having two motor cylinders and two pulsator valves, it would be operative and in some situations would serve its purpose if but one cylinder and valve were used, the balance wheel being depended upon for moving the piston in one direction.

Although the device as shown is adapted to alternately connect the service pipes or teat-cup leads with the suction pipe and with atmosphere, the invention is of sufficient scope to include devices in which the air introduced may be above atmospheric pressure.

It will be understood that the pipes *f*, *f'*, may be, and preferably are, branches from the same source of suction or vacuum.

What I claim as new is:

1. In a pulsator, in combination, a suction pipe, a pair of service pipes, valves for connecting the service pipes alternately with the suction pipe and a source of air, the valves being oppositely set and means actuated by suction in the service pipes for operating the valves.

2. In a pulsator, in combination, a suction pipe, a service pipe, a valve for alternately connecting the service pipe with the suction pipe and with a source of air, a reciprocating motor for operating the valve, a momentum wheel for regulating the motor, and connection between the service pipe and the motor for actuating the motor.

3. In a pulsator, in combination, a suction pipe, a service pipe, a valve for alternately connecting the service pipe with the suction pipe and with a source of air, a reciprocating motor for actuating the valve and having an end of its cylinder open to atmosphere and the other end thereof in communication with the service pipe such communication being controlled by the named valve.

4. In a pulsator, in combination, a suction pipe, a service pipe, a valve for alternately connecting the service pipe with the suction pipe and with a source of air, a reciprocating motor for actuating the valve and having an end of its cylinder open to atmosphere, the other end thereof being in communication with the service pipe, such communication being controlled by the named valve, and a regulating valve in connection with the service pipe.

5. In a pulsator for a milking machine, in combination, two independent service pipes, teat-cup pipes leading from such service pipe, exhaust pipes, rotating valves connecting each service pipe with one of the exhaust pipes, each valve being adapted to open communication between the service pipe with which it is associated alternately with the exhaust pipe and with a source of air, such two valves being oppositely set, intermeshing gears connecting the two valves, and a suction motor controlled by and actuating the valves.

6. In a pulsator for a milking machine, in combination, two independent service pipes, teat-cup pipes leading from such service pipes, exhaust pipes, rotating valves connecting each service pipe with one of the exhaust pipes, each valve being adapted to open communication between the service pipe with which it is associated alternately with the exhaust pipe and with a source of air, such two valves being oppositely set, intermeshing gears connecting the two valves, a crank attached to the spindle of one of the valves, a pair of reciprocating motors each having its piston connected to the crank, and a duct connecting each service pipe with one of the motor cylinders.

7. In a pulsator for milking machines, in combination, a service pipe, an exhaust pipe, a valve casing interposed between said pipe and having an axial nipple connected to the service pipe and a lateral nipple connected with the exhaust pipe and a lateral port, a rotary valve within the casing, such valve having a central chamber, an axial port, and a lateral port, a reciprocating vacuum motor for rotating the valve and a pipe connecting the motor with the service pipe.

In witness whereof I have hereunto set my hand this 11th day of December, 1914.

LIONEL BULL.

Witnesses:
 FRANK D. THOMASON,
 FLORENCE MITCHELL.